US006807416B2

(12) United States Patent
Nyholm

(10) Patent No.: US 6,807,416 B2
(45) Date of Patent: Oct. 19, 2004

(54) TROUBLESHOOTING METHOD AND APPARATUS

(75) Inventor: Kenneth Nyholm, Tampere (FI)

(73) Assignee: Nokia Corporation, Espoo (FI)

( * ) Notice: Subject to any disclaimer, the term of this patent is extended or adjusted under 35 U.S.C. 154(b) by 578 days.

(21) Appl. No.: 09/862,715

(22) Filed: May 22, 2001

(65) Prior Publication Data

US 2002/0006791 A1 Jan. 17, 2002

Related U.S. Application Data

(63) Continuation of application No. PCT/EP98/08063, filed on Dec. 10, 1998.

(51) Int. Cl.$^7$ .............................................. H04B 17/00
(52) U.S. Cl. .................... 455/423; 455/424; 455/432.3; 455/67.11
(58) Field of Search .............................. 455/423, 422.1, 455/424, 410, 414.1, 432.3, 67.11, 67.12, 67.13

(56) References Cited

U.S. PATENT DOCUMENTS

| | | | |
|---|---|---|---|
| 5,654,901 A | | 8/1997 | Boman |
| 5,751,914 A | * | 5/1998 | Coley et al. .................. 706/47 |
| 6,069,881 A | * | 5/2000 | Jiang et al. .................. 370/318 |
| 6,188,916 B1 | * | 2/2001 | Noda et al. .................. 455/567 |
| 6,223,032 B1 | * | 4/2001 | Cuffaro ....................... 455/425 |
| 6,336,035 B1 | * | 1/2002 | Somoza et al. ............. 455/446 |
| 6,339,705 B1 | * | 1/2002 | Pehrson ...................... 455/419 |
| 6,356,758 B1 | * | 3/2002 | Almeida et al. ............ 455/446 |

FOREIGN PATENT DOCUMENTS

| WO | WO 98/24222 | 6/1998 |
|---|---|---|
| WO | WO 98/38823 | 9/1998 |

OTHER PUBLICATIONS

International Search Report for PCT/EP98/08063.

* cited by examiner

*Primary Examiner*—Cong Van Tran
(74) *Attorney, Agent, or Firm*—Squire, Sanders & Dempsey LLP

(57) ABSTRACT

A troubleshooting method and apparatus is described for performing troubleshooting in a telecommunication network on the basis of a delivered software probe. The probe can be triggered for troubleshooting purposes with different parameters defining the probing actions to be taken. The result of the triggered probing action is reported. Thus, when a problem or malfunction is detected, the probe can be run with certain parameters determined on the basis of a rough guess as to the part of the system in which the problem has occurred. Based on the reported results, a detailed evaluation of the malfunction can be performed. Thus, troubleshooting is made more effective, since less time is spent for sending requests for troubleshooting information by mail or by phone.

14 Claims, 3 Drawing Sheets

TROUBLESHOOTING METHOD AND APPARATUS

This is a continuation of application No. PCT/EP98/08063 filed Dec. 10, 1998.

FIELD OF THE INVENTION

The present invention relates to a troubleshooting method and system for performing troubleshooting in a telecommunication network such as the GSM (Global System for Mobile Communications) or the NMT (Nordic Mobile Telephone).

BACKGROUND OF THE INVENTION

A Network Management System (NMS) is a tool for monitoring and administration of medium to large networks such as telecommunication networks. The NMS creates and constantly updates a data base on all servers or network elements of the network. The NMS requires no local agent and detection and monitoring are performed fully automatic, but controllable.

FIG. 1 shows a principle block diagram of an NMS. According to FIG. 1, a server 1 of the NMS is provided which controls network elements NE1 to NEn directly by using the Q3 protocoll or MML (Man Machine Language), or through a generic agent system or mediator 2. The control of the network elements NE1 to NEn may be performed by using the CORBA (Common Object Request Broker Architecture) technology which specifies mechanisms and interfaces for building distributed object oriented applications.

The mediator 2 acts as an interpreter and filter, sending commands to the network elements NE1 to NEn it controls, and collecting information about the managed elements. By using such mediators, telecommunication service providers can integrate legacy systems as well as new network elements into the network management system. This enables them to save time and money on network management, at the same time as increasing the quality of the service they provide to customers.

Manual intervention is required for example when critical alarms are received from network elements and actions like configuration changes of radio network parameters or software updates are needed. Usually, operating persons at the NMS site control the state of the network and deal with problems at once. The NMS can alert specified operating persons using email, message pager and even a short message service of GSM cell phones. If a regional NMS site is not manned 24 hours per day, a Network Management Center (NMC) may be used for controlling the networks of the regional NMS site during the absence of the operating persons, e.g. in the night time.

Troubleshooting of NMS systems is a very frequent, time- and resource-consuming task, wherein the effectiveness of the troubleshooting process has a big impact on customer satisfaction.

In the known systems, troubleshooting is carried out by sending requests for information by mail or by phone in order to find out problems concerning e.g. directory structures, file protections, data base contents, user and group settings, authorities, log files, contents of miscellaneous configuration files, etc. However, this is a very time consuming and tedious process.

SUMMARY OF THE INVENTION

It is therefore an object of the present invention to provide a troubleshooting method and apparatus for a network management system, by means of which troubleshooting can be performed in a more effective manner.

This object is achieved by a method for performing troubleshooting in a telecommunication network, comprising the steps of:

providing a probing program at a site of said network;

triggering the probing program with a predetermined parameter defining a probing action of the probing program, when a problem or malfunction has been detected; and reporting the result of the triggered probing action.

Additionally, the above object is achieved by an apparatus for performing troubleshooting in a telecommunication network, comprising:

loading means for loading a probing program;

probing means for performing a predetermined probing action based on said probing program in response to an input parameter defining said probing action; and filing means for generating a file comprising the result of said probing action.

Accordingly, troubleshooting can be made more effective, since the probing program or software probe can be triggered with certain parameters determined on the basis of a rough evaluation as to the part of the system where the problem might have occurred. Thus, the time required for troubleshooting and the resulting downtimes of the telecommunication network can be reduced.

Preferably, the troubleshooting may be performed in a network management system of the telecommunication network. In this case, the result of the triggered probing action may be reported to a supplier of the network management system. Thus, the reporting can be performed by the customer NMS site personnel. The generated file with the results of the "probing" can then be sent together with a malfunction report to R&D personnel of the NMS supplier.

The probing actions of the probing program may comprise listing a directory structure, performing a predefined query, e.g. an SQL query, setting a system querying, issuing management commands and/or listing the content of a specific file.

Preferably, probing actions are defined in a configuration file, which may be extended when the probing program is enhanced by the NMS supplier.

Furthermore, the result of the triggered probing action may be compressed and encrypted into a file to be delivered to the NMS supplier together with the malfunction report. Thereby, the results can be easily delivered by email to the NMS R&D personnel.

Preferably, the probing program is delivered to the NMS customer with each software release of the network management system.

The probing program may be loaded and executed at any work station or server at the customer site.

BRIEF DESCRIPTION OF THE DRAWINGS

In the following, the present invention will be described in greater detail on the basis of a preferred embodiment with reference to the accompanying drawings, in which.

DESCRIPTION OF THE PREFERRED EMBODIMENT

Figure 1:
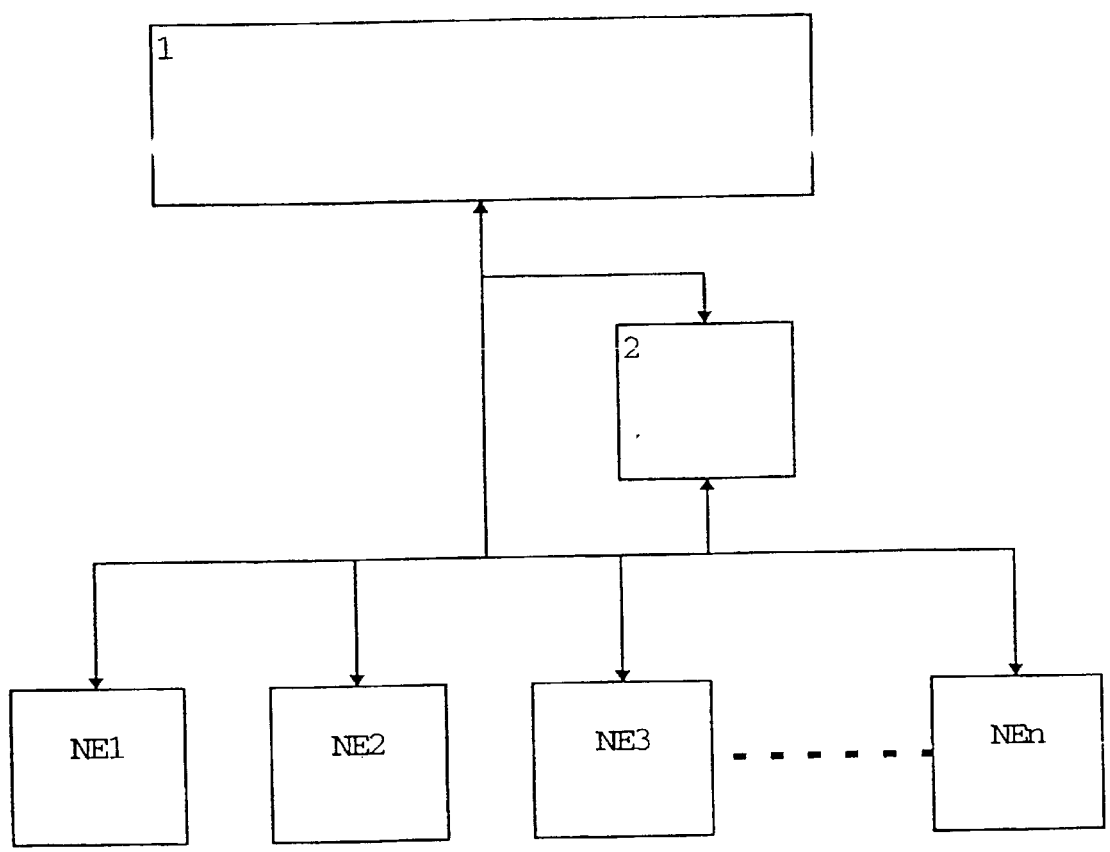
FIG. 1 shows a principle block diagram of a network management system.

In the following, the preferred embodiment of the method and apparatus according to the present invention will be described on the basis of a network management system as shown in FIG. 1.

According to the preferred embodiment, a software probe, i.e. an executable software package, is delivered together with each NMS software release. This software probe can be installed at any workstation or server at the customer NMS site.

Figure 2:
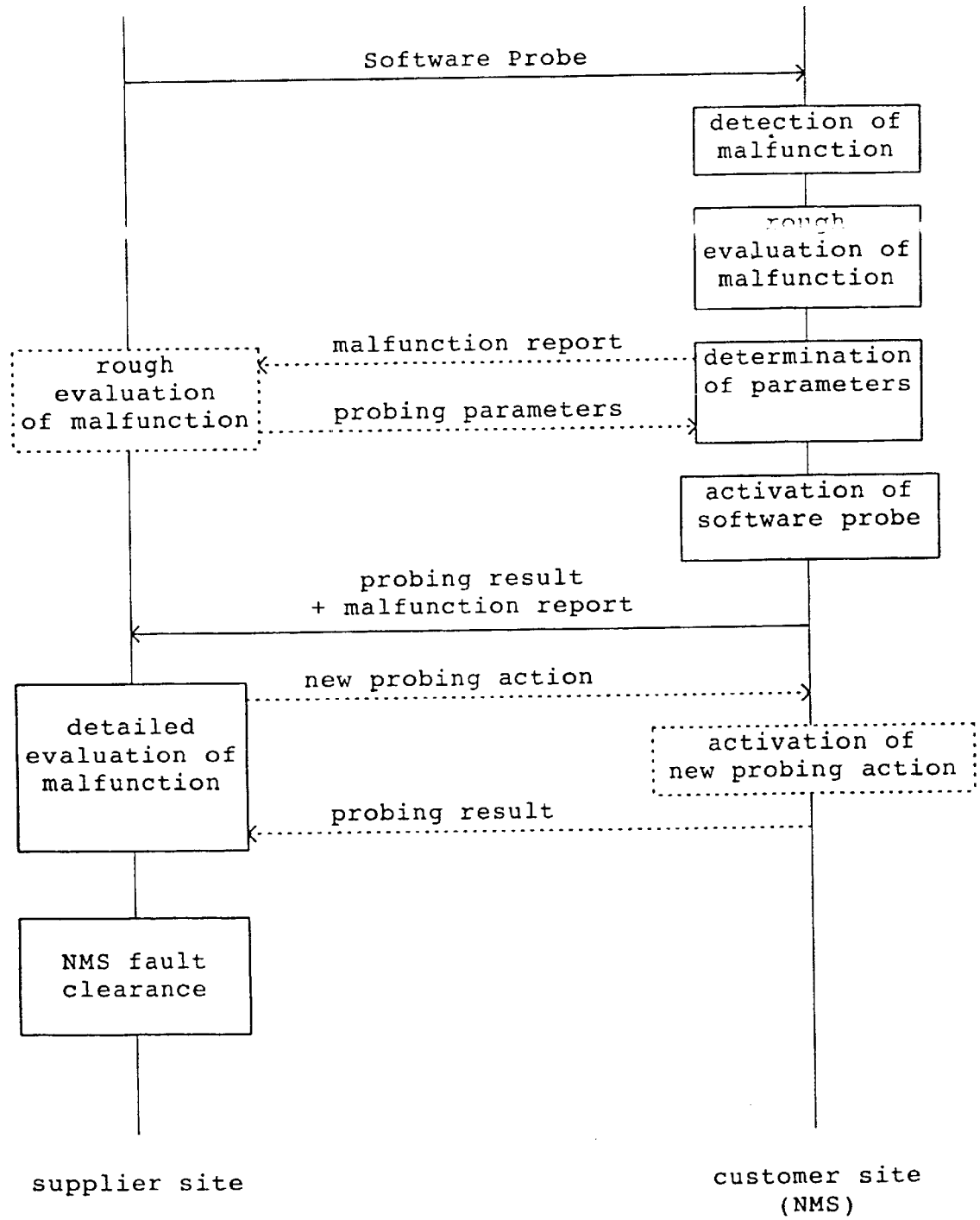
FIG. 2 shows a diagram of an information transfer and flow at an NMS supplier site and an NMS customer site according to a preferred embodiment of the present invention.

FIG. 2 shows a diagram of the information flow between and at a supplier site and a customer site. According to FIG. 2, the software probe is delivered to the customer site, where it is installed into the NMS system. When a malfunction is detected by the NMS personnel at the customer site, a rough evaluation as to the problem and the corresponding part of the network management system is performed. Based on this rough evaluation, parameters defining the probing action of the software probe are determined.

Optionally, a malfunction report is transmitted to the supplier site, in case a determination of parameters is not possible on the basis of the rough evaluation at the customer site. At the supplier site, a rough evaluation of the malfunction is performed by the R&D personnel of the NMS supplier based on the malfunction report, and corresponding probing parameters are returned to the customer site.

Subsequently, the software probe is triggered or activated so as to perform a probing action defined by the previously obtained or determined probing parameters. These probing actions comprise listing directory structures, SQL (Structured Query Language) queries, listing the contents of specific files, etc.

Additionally, the probing actions may comprise querying settings of the computer system by means of different system commands such as "ypcat" (query information about the NIS configuration) or other commands. Some actions could also imply some management commands to be executed to the network elements in order to query some configuration settings in them. Thereby, the network element configuration stored in an NMS database can be compared to the real configuration of the actual network elements in order to detect differences which often cause problems.

The set of supported actions of the software probe is preferably defined in a configuration file, which can be extended by the supplier of the NMS.

The results of the probing action is delivered to the NMS customer site together with a malfunction report. Preferably, the results of the probing action are compressed and encrypted into a single file which can be easily delivered by email or the like.

Based on the probing results and the malfunction report, a detailed evaluation of the malfunction is performed at the supplier site to thereby determine the required actions for the clearance of the NMS fault.

Optionally, a new routine or subroutine defining a new probing action is transmitted to the customer site, in case the performed probing action was not sufficient for an exhaustive evaluation of the malfunction. At the customer site, the new probing action is activated and the probing result is then transmitted to the supplier site, where the detailed evaluation of the malfunction is continued.

Finally, actions required for a clearance of the NMS fault are determined and eventually performed by the R&D personnel at the supplier site to thereby finish the troubleshooting process according to the preferred embodiment.

Figure 3:
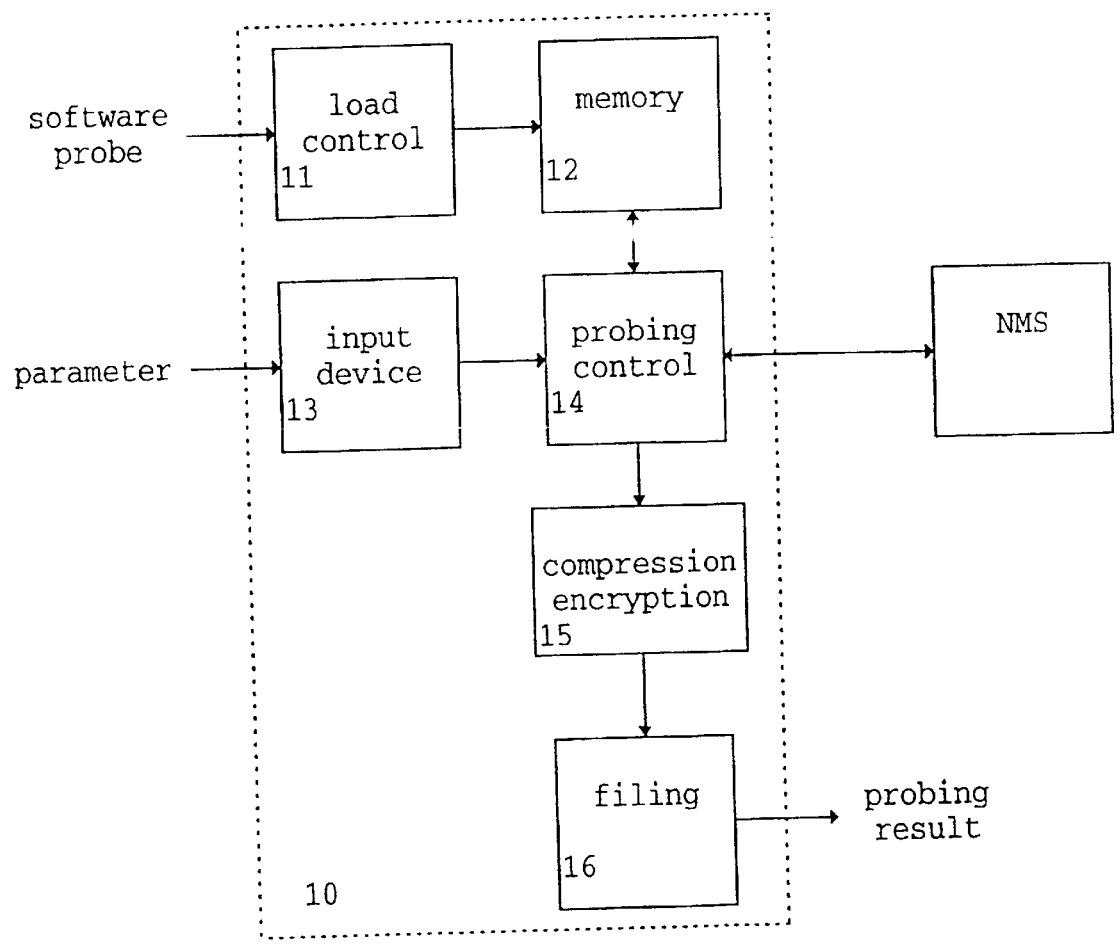
FIG. 3 shows a principle block diagram of a troubleshooting apparatus according to the preferred embodiment of the present invention.

FIG. 3 shows a troubleshooting apparatus 10 according to the preferred embodiment of the present invention. The troubleshooting apparatus 10 may be comprised in the server 1 or in a work station or server connected to the server 1 or any network element at the customer NMS site.

According to FIG. 3, the troubleshooting apparatus 10 comprises a load control means 11 arranged to load a software probe delivered within an NMS software release into a memory 12. Of course, the software probe may also be delivered separately to the NMS customer. The memory 12 can be a hard disk of the work station or server or any other suitable memory means.

Furthermore, an input device 13 is provided for inputting probing parameters used for defining probing actions to be performed by a probing control means 14 which is connected to the network management system. The input device 13 can be a keyboard, a mouse system with a corresponding display device, a speech-controlled input system or the like. The probing control means 14 can be a CPU of the work station or server which performs probing control based on routines of the software probe stored in the memory 12. The results of the probing action defined by the input probing parameters is encoded in a coding means 15 which performs a compression and/or encryption of the probing results so as to generate a single file in a filing means 16. The filing means 16 can be arranged as an internal or external memory.

Alternatively, the probing results may also be stored in the memory 12.

The file containing the probing results is delivered to the NMS supplier as an electronic file by email or the like. Alternatively, the file could be written on a floppy disk or the like and delivered by mail.

The above preferred embodiment can be implemented in any NMS platform and could be used for any kind of NMS application such as a GSM system, a NMT system or any other telecommunication network.

In summary, a troubleshooting method and apparatus is described for performing troubleshooting in a telecommunication network on the basis of a delivered software probe. The probe can be triggered for troubleshooting purposes with different parameters defining the probing actions to be taken. The result of the triggered probing action is reported. Thus, when a problem or malfunction is detected, the probe can be run with certain parameters determined on the basis of a rough guess as to the part of the system in which the problem has occurred. Based on the reported results, a detailed evaluation of the malfunction can be performed. Thus, troubleshooting is made more effective, since less time is spent for sending requests for troubleshooting information by mail or by phone.

It is to be noted that the troubleshooting method and apparatus described in the preferred embodiment is not restricted to the features described in the preferred embodiment of the present invention. The troubleshooting method and system according to the present invention can be used in any telecommunication network. The above description of the preferred embodiment and the accompanying drawings are only intended to illustrate the present invention. The embodiment of the present invention may vary within the scope of the attached claims.

What is claimed is:

1. A method for a network management system for troubleshooting in a telecommunication network, comprising the steps of:

providing a probing program at a site of said network management system;

detecting at least one of a problem and a malfunction;

determining at least one parameter out of a plurality of predetermined parameters based on said detecting step;

triggering the probing program with said at least one determined parameter defining a probing action of said probing program; and reporting a result of the triggered probing action.

2. A method according to claim 1, wherein said troubleshooting is performed in the network management system of said telecommunication network.

3. A method according to claim 2, wherein said result of the triggered probing action is reported to a supplier of the network management system.

4. A method according to claim 1, wherein said probing action comprises at least one of listing a directory structure, performing a predefined query such as an SQL query, setting a system querying, issuing management commands and listing the content of a specific file.

5. A method according to claim 1, wherein available probing actions of said probing program are defined in a configuration file.

6. A method according to claim 5, wherein said configuration file is extended when said probing program is enhanced by the network supplier.

7. A method according to claim 1, wherein said result of said triggered probing action is compressed and encrypted into a single file to be delivered to a network supplier together with a malfunction report.

8. A method according to claim 3, wherein said probing program is delivered to said network site with each software release of said network management system.

9. An apparatus for a network management system for troubleshooting in a telecommunication network, comprising:

loading means for loading a probing program at a site of said network management system;

detecting means for detecting at least one of a problem and a malfunction;

determining means for determining at least one parameter out of a plurality of predetermined parameters based on an output of the detecting means;

probing means for performing a probing action of said probing program in response to said at least one determined parameter defining said probing action; and filing means for generating a file comprising a result of said probing action.

10. An apparatus according to claim 9, wherein said troubleshooting is performed at a customer site of the network management system.

11. An apparatus according to claim 10, wherein said apparatus is one of a work station and a server at said customer site.

12. An apparatus according to claim 9, further comprising coding means for coding said result of said probing action before generating said file.

13. An apparatus according to claim 12, wherein said coding means is arranged to perform compression and encryption processing.

14. An apparatus according to claim 9, wherein said network management system is provided for managing a GSM system.

* * * * *